US011822000B2

(12) United States Patent
Schober et al.

(10) Patent No.: US 11,822,000 B2
(45) Date of Patent: Nov. 21, 2023

(54) METHOD FOR ANGLE OF ARRIVAL ESTIMATION IN AN IMPULSE-RADIO ULTRA-WIDEBAND COMMUNICATIONS SYSTEM

(71) Applicant: NXP B.V., Eindhoven (NL)

(72) Inventors: Michael Schober, Graz (AT); Pablo Corbalán Pelegrín, Graz (AT); Shengyang Xu, Irvine, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/453,594

(22) Filed: Nov. 4, 2021

(65) Prior Publication Data
US 2023/0134329 A1  May 4, 2023

(51) Int. Cl.
  *G01S 5/04*   (2006.01)
  *G01S 3/48*   (2006.01)
  *G01S 3/46*   (2006.01)
  *G01S 3/02*   (2006.01)
  *H04B 1/7163* (2011.01)

(52) U.S. Cl.
  CPC .............. *G01S 3/48* (2013.01); *G01S 3/46* (2013.01); *G01S 3/023* (2013.01); *H04B 1/7163* (2013.01)

(58) Field of Classification Search
  CPC ... G01S 3/48; G01S 3/023; G01S 3/46; H04B 1/7163
  (Continued)

(56) References Cited

U.S. PATENT DOCUMENTS

| 6,208,297 | B1 * | 3/2001 | Fattouche | H04W 64/00 |
| | | | | 342/450 |
| 8,116,350 | B1 | 2/2012 | Arndt et al. | |

(Continued)

FOREIGN PATENT DOCUMENTS

| CN | 112769505 A | * | 5/2021 | ............... H01Q 3/08 |
| WO | 2019200153 A1 | | 10/2019 | |
| WO | WO-2022206139 A1 | * | 10/2022 | ............... G01S 3/46 |

OTHER PUBLICATIONS

Dotlic, Igor et al. "Angle of Arrival Estimation Using Decawave DW1000 Integrated Circuits", Published in: 2017 14th Workshop on Positioning, Navigation and Communications (WPNC); Oct. 25-26, 2017; Bremen, Germany; DOI: 10.1109/WPNC.2017.8250079.

(Continued)

*Primary Examiner* — Chuong P Nguyen
(74) *Attorney, Agent, or Firm* — Daniel D. Hill (57) ABSTRACT

A method is provided for estimating a signal's angle of arrival (AOA) in a communications system. Starting values for each of a horizontal AOA and a vertical AOA are estimated. The estimated vertical AOA starting value is used to select a horizontal PDOA trace of horizontal PDOA calibration data. The selected horizontal PDOA trace is interpolated to determine a best horizontal AOA estimate for a current iteration. The estimated horizontal AOA starting value is used to select a vertical PDOA trace of vertical PDOA calibration data. The selected vertical PDOA trace is interpolated to determine a best vertical AOA estimate for the current iteration. After each iteration, determining if a maximum number of iterations has been reached or if the best horizontal or vertical AOA estimate has not changed by a predetermined amount. When one of these is true, the best horizontal and vertical AOA estimates are used.

20 Claims, 6 Drawing Sheets

(58) Field of Classification Search
USPC .................................................. 342/442, 417
See application file for complete search history.

(56) References Cited

U.S. PATENT DOCUMENTS

| | | | | |
|---|---|---|---|---|
| 10,539,645 | B2* | 1/2020 | Bialer | ........................ G01S 3/50 |
| 10,690,780 | B1 | 6/2020 | Zarubica et al. | |
| 10,732,253 | B2* | 8/2020 | Smith | .................. H01Q 21/065 |
| 10,834,534 | B2* | 11/2020 | Kim | ........................ G01S 5/10 |
| 10,890,644 | B1* | 1/2021 | Berger | .................... G01S 13/74 |
| 11,428,772 | B2* | 8/2022 | Tertinek | .................... G01S 3/10 |
| 11,516,621 | B2* | 11/2022 | Al-kadi | .................... G01S 3/46 |
| 2013/0271323 | A1* | 10/2013 | Joo | .......................... G01S 3/48 |
| | | | | 342/442 |
| 2016/0334498 | A1* | 11/2016 | Jamieson | ............ G01S 5/02213 |
| 2019/0056472 | A1* | 2/2019 | Smith | ........................ G01S 3/46 |
| 2019/0331783 | A1* | 10/2019 | McLaughlin | ....... G01S 13/0209 |
| 2023/0052581 | A1* | 2/2023 | Corbalán Pelegrín | .. G01S 3/023 |

OTHER PUBLICATIONS

Wang, Tianyu et al.; "An Efficient Single-Anchor Localization Method Using Ultra-Wide Bandwidth Systems"; MDPI Journal of Applied Sciences; vol. 10, Issue 1; Received Nov. 20, 2019, Published Dec. 19, 2019; DOI: 10.3390/app10010057.
IEEE 802.15.4 Standard for Local and Metropolitan Area Networks; Low-Rate Wireless Personal Area Networks (LR-WPANs); Sep. 5, 2011.

* cited by examiner

METHOD FOR ANGLE OF ARRIVAL ESTIMATION IN AN IMPULSE-RADIO ULTRA-WIDEBAND COMMUNICATIONS SYSTEM

BACKGROUND

Field

This disclosure relates generally to data processing, and more particularly, to a method for estimating an angle of arrival (AOA) in an impulse-radio ultra-wideband (IR-UWB) communications system.

Related Art

Impulse-radio ultra-wideband (IR-UWB) is a radio frequency (RF) communication technology that uses short pulses for ranging, localization, and data communication. An advantage of IR-UWB compared to other radio technologies is its capability for accurately measuring the phase difference of arrival (PDOA) at two or more antenna pairs despite multipath propagation. These PDOA measurements can then be used to estimate the angle of arrival (AOA) of the incoming signal. Unfortunately, the PDOA not only depends on the incoming angle of the signal but also on the phase responses of the antenna system. Therefore, to accurately estimate the AOA, the imperfections of the antenna design need to be considered and compensated for.

Figure 1:
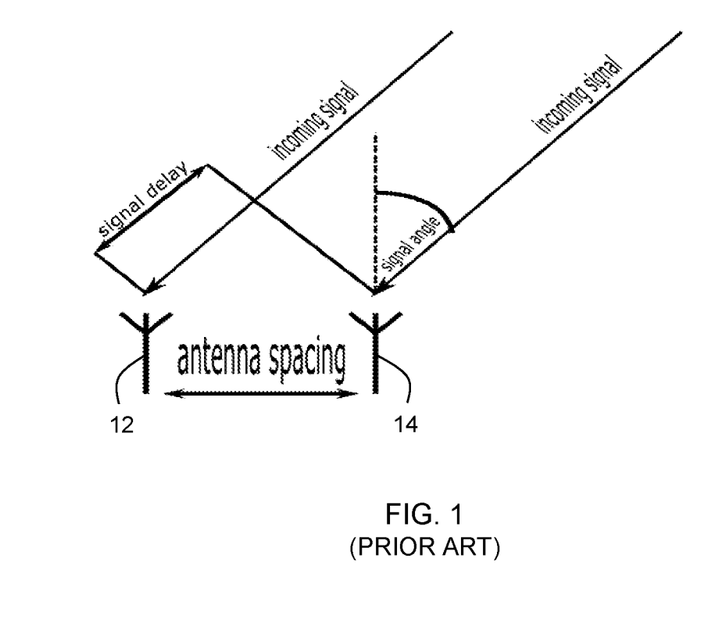
FIG. 1 illustrates an antenna pair on a device receiving an incoming IR-UWB signal in accordance with the prior art.

FIG. 1 shows an example of a system comprising two antennas 12 and 14 receiving an incoming signal with a given angle. Depending on the incoming angle of the signal relative to the antenna axis, antenna 12 receives the incoming signal a short delay after antenna 14. This delay is caused by antenna 12 being further away from the transmitter (not shown) so that the incoming signal has a longer propagation delay. This delay relates to the AOA of the incoming signal to be determined.

Assuming an ideal antenna setup with ideal phase response, the signal delay could be described by equation (1):

$$\text{signal delay} = \sin(\text{signal angle}) * \text{antenna spacing} \quad (1)$$

Figure 2:
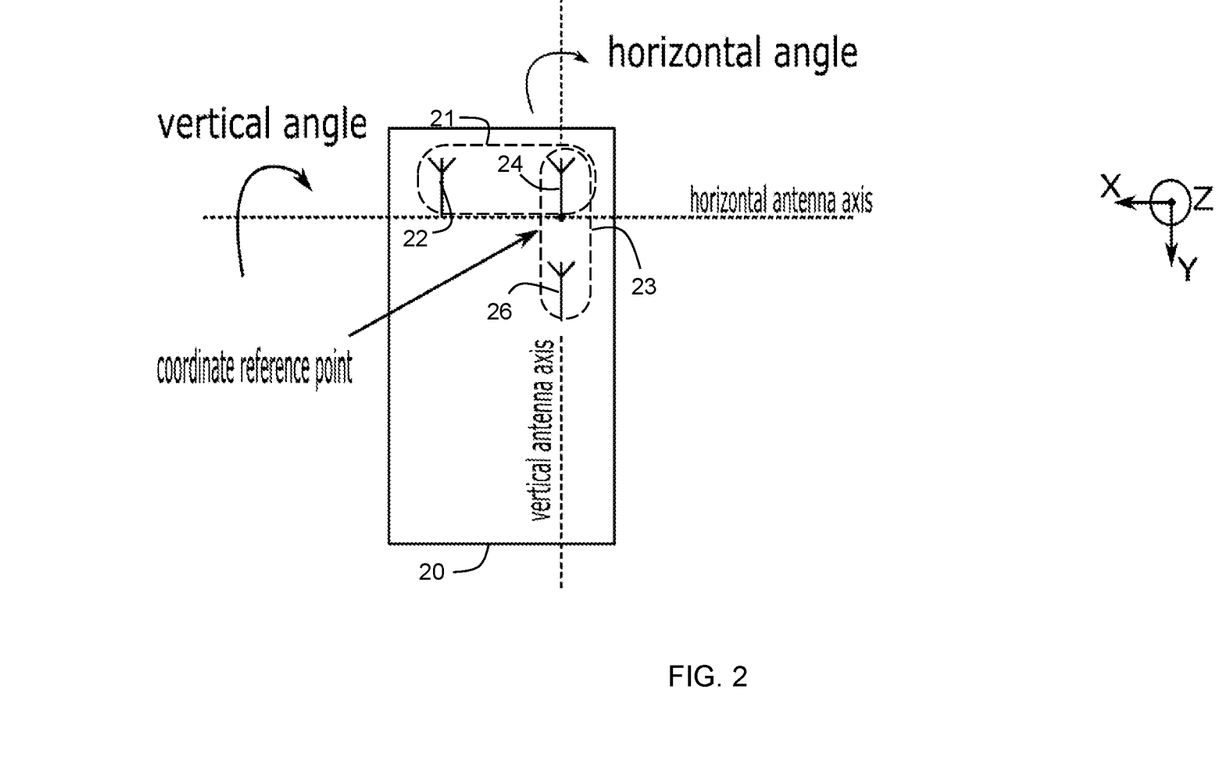
FIG. 2 illustrates an AOA of arrival measurement system for measuring a vertical and horizontal AOA.

In a real, physical AOA measurement system, there is a vertical and a horizontal signal angle that can be measured. FIG. 2 shows an example three-dimensional (3D) AOA measurement system 20 consisting of horizontal and vertical antenna pairs measuring, respectively, a horizontal and vertical AOA. AOA measurement system 20 may be part of a cellphone or other electronic device. In FIG. 2, the horizontal antenna pair 21 includes antennas 22 and 24 while the vertical antenna pair 23 includes antennas 24 and 26. As can be seen, antenna 24 is used for both the horizontal and vertical antenna pairs. The vertical angle is commonly referred to as the elevation angle while the horizontal angle is commonly called the azimuth angle. For reference, the x, y, and z axis diagram is provided on the right side of FIG. 2, where the "coordinate reference point" of measurement system 20 is circled on an intersection of the axis.

Unfortunately, in a real-world scenario the signal delay measured at the feeding point of the antennas depends on the antenna setup, not just on the two-dimensional projection of the incoming signal as illustrated in FIG. 1. This means that solely using the PDOA measurement of a single antenna pair does not lead to an accurate AOA estimate.

Therefore, what is needed is a method for an AOA measurement system that is more accurate.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for estimating an AOA of a received signal in a communications system. Initially, horizontal PDOA calibration data and vertical PDOA calibration data are created and stored in lookup tables or arrays of the communication system. In the method, starting values for each of the horizontal and vertical AOA of a received signal are estimated. An iteration counter may be set to an initial value, such as zero. The vertical AOA starting value is used to select a horizontal PDOA trace of the horizontal PDOA calibration data. The selected PDOA trace is interpolated to determine a best fitting horizontal AOA estimate for a current iteration. Likewise, the horizontal AOA starting value is used to select a vertical PDOA trace of the vertical PDOA calibration data. The selected vertical PDOA trace is interpolated to determine a best fitting vertical AOA estimate for the current iteration. The method is iterated until either a predetermined value representing change between two consecutive iterations is reached, or until a maximum number of iterations is reached, whichever comes first. At that time, the best fitting horizontal and vertical AOA estimates are reported. Determining the AOA estimates as described herein provides an efficient method to determine a direction to a transmitter of a transmitted signal.

In accordance with an embodiment, there is provided, a method for angle of arrival (AOA) estimation in a communications system, the method including: estimating starting values for each of a horizontal AOA and a vertical AOA from a received signal; setting an iteration counter to an initial value; using the vertical AOA starting value to select a horizontal PDOA trace of horizontal PDOA calibration data; interpolating the selected horizontal PDOA trace to determine a best fitting horizontal AOA estimate for a current iteration; using a horizontal AOA starting value to select a vertical PDOA trace of vertical PDOA calibration data; interpolating the selected vertical PDOA trace to determine a best fitting vertical AOA estimate for the current iteration; iterating the steps of using and interpolating one or more times; after each iteration, increasing the iteration counter and determining if a maximum number of iterations has been reached or if the best fitting horizontal or vertical AOA estimate has not changed by a predetermined amount; when the maximum number of iterations has been reached or when the best fitting horizontal or vertical AOA estimate has not changed by a predetermined value from one iteration to another iteration, reporting the best fitting horizontal and vertical AOA estimates; and using the best fitting horizontal and vertical AOA to determine a direction to a transmitting device of the received signal. The method may further include: generating the horizontal antenna pair PDOA calibration data from a pair of horizontal antennas; and generating the vertical antenna pair PDOA calibration data from a pair of vertical antennas. The horizontal antenna pair PDOA calibration data and the vertical antenna pair PDOA calibration data may be stored as tables or arrays in the communication system. Estimating the starting values may further include taking an argument of the minimum of a difference of a horizontal antenna pair PDOA calibration point and a measured horizontal antenna pair PDOA plus a difference of a vertical antenna pair PDOA calibration point and a measured vertical antenna pair PDOA. Both steps of interpolating may further include creating a new trace by combining two existing traces of the vertical and horizontal antenna pair PDOA calibration data. The new trace is created by weighting and averaging a trace above the vertical and horizontal AOA estimates and a trace below the vertical and horizontal AOA estimates. The communications system may be an impulse-radio ultra-wideband (IR-UWB) system. The steps of interpolating may be one of either a linear, squared, or cubic spline interpolation. The vertical and horizontal PDOA calibration data may be stored in memory of the communications system in the form of lookup tables. The communications system may be implemented in a cellphone.

In another embodiment, there is provided, a communications system including: a transceiver coupled to a pair of horizontal antennas and to a pair of vertical antennas, the pairs of antennas for receiving a signal for determining an angle of arrival (AOA); a memory for storing AOA estimation code; and a processor for executing the AOA estimation code, wherein the AOA estimation code includes: instructions for estimating starting values for each of a horizontal AOA and a vertical AOA from the received signal; instructions for using the vertical AOA starting value to select a horizontal PDOA trace of horizontal PDOA calibration data; instructions for interpolating the selected horizontal PDOA trace to determine a best fitting horizontal AOA estimate for a current iteration; instructions for using the horizontal AOA starting value to select a vertical PDOA trace of vertical PDOA calibration data; instructions for interpolating the selected vertical PDOA trace to determine a best fitting vertical AOA estimate for the current iteration; instructions for iterating the steps of using and interpolating one or more times; instructions for determining, after each iteration, if a maximum number of iterations has been reached or if the best fitting horizontal or vertical AOA estimate has not changed by a predetermined amount; and when the maximum number of iterations has been reached or when the best fitting horizontal or vertical AOA estimate has not changed by a predetermined amount from one iteration to another iteration, instructions for reporting the best fitting horizontal and vertical AOA estimates. The communications system may further include: instructions for generating the horizontal antenna pair PDOA calibration data from a pair of horizontal antennas; and instructions for generating the vertical antenna pair PDOA calibration data from a pair of vertical antennas. The horizontal antenna pair PDOA calibration data and the vertical antenna pair PDOA calibration data may be stored as tables or arrays in the memory. The instructions for estimating the starting values may further include instructions for taking an argument of the minimum of a difference of a horizontal antenna pair PDOA calibration point and a measured horizontal antenna pair PDOA plus a difference of a vertical antenna pair PDOA calibration point and a measured vertical antenna pair PDOA. The instructions for interpolating may further include creating a new trace by combining two existing traces of the vertical and horizontal antenna pair PDOA calibration data. The new trace may be created by weighting and averaging a trace above the vertical and horizontal AOA estimates and a trace below the vertical and horizontal AOA estimates. The communications system may be an impulse-radio ultra-wideband (IR-UWB) localization system. The maximum number of iterations may have been reached when a counter value reaches a predetermined maximum value. The vertical and horizontal PDOA calibration data may be stored in memory of the communications system in the form of lookup tables. The communications system may be part of a cellphone.

Figure 3:
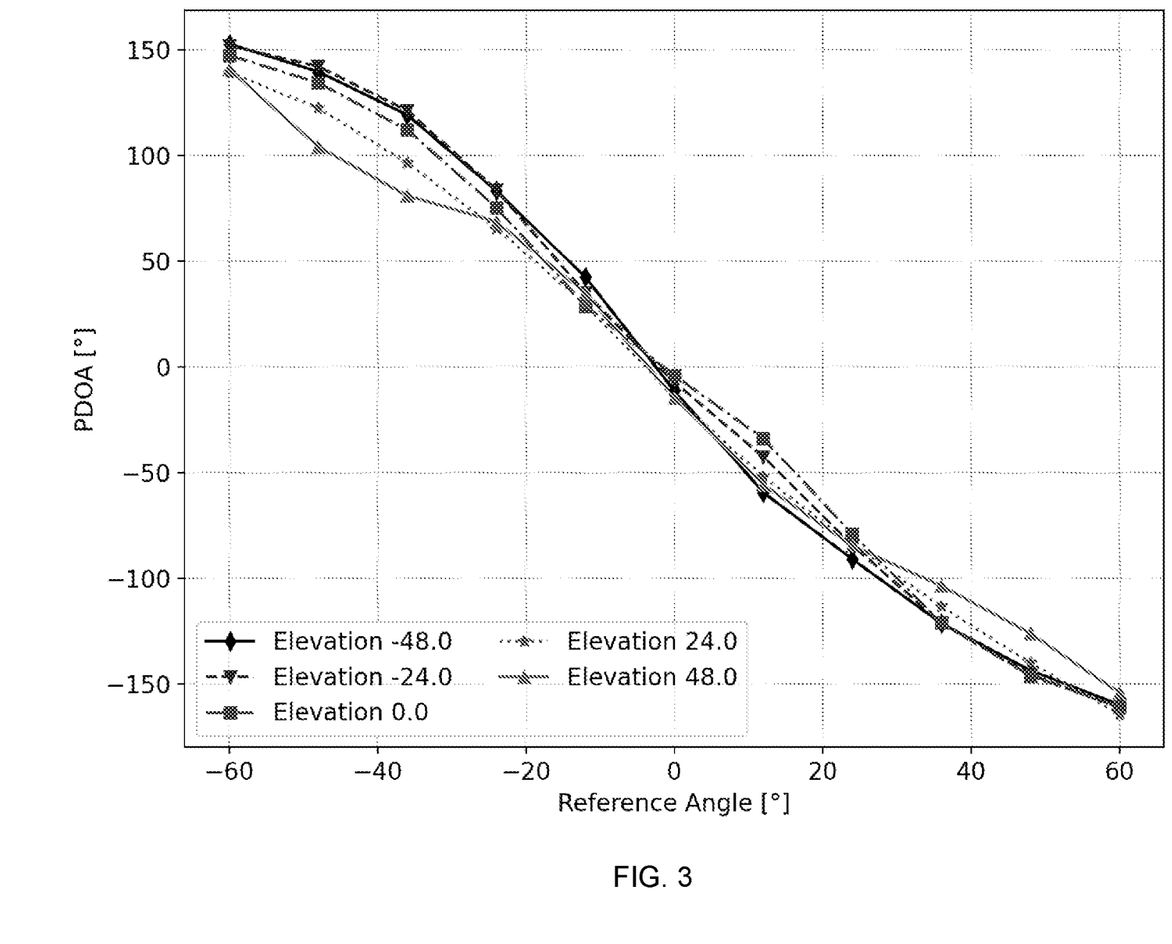
FIG. 3 illustrates a graph of horizontal antenna pair PDOA calibration values as a function of reference azimuth angle.

FIG. 3 illustrates a graph of horizontal antenna pair PDOA1 calibration values as a function of a reference azimuth angle. FIG. 3 shows an example of the PDOA1 response of the horizontal antenna pair with respect to the azimuth angle under 5 different elevation angles (different curves in the plot). Note that only 5 curves are shown for purposes of simplicity and clarity. In another embodiment, more curves, or traces, may be provided. The calibration values of FIG. 3 are stored in a memory of, for example, a communications system, as a lookup table or array to be used for the AOA estimation method described herein.

Figure 4:
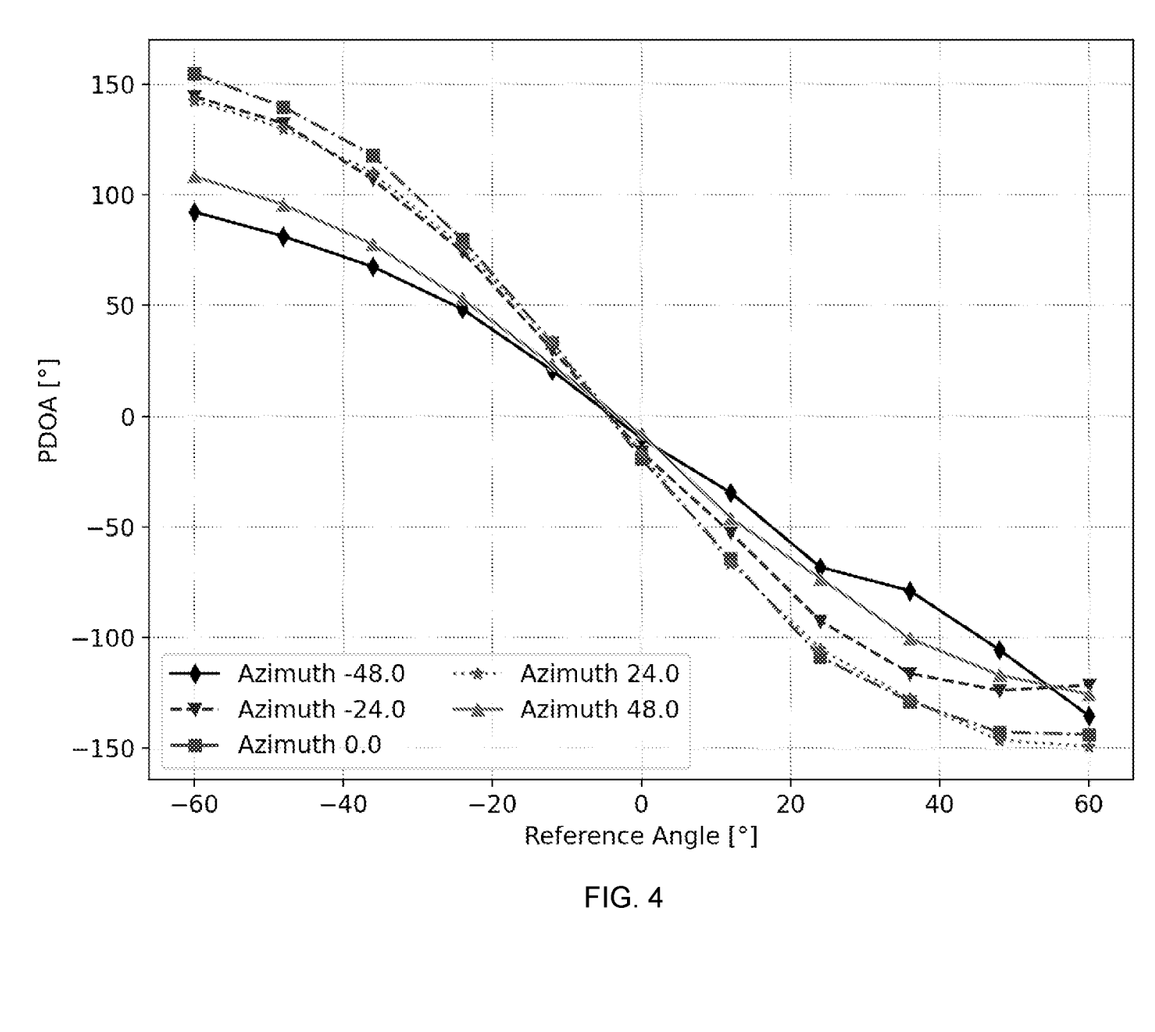
FIG. 4 illustrates a graph of vertical antenna pair PDOA calibration values as a function of reference elevation angle.

FIG. 4 illustrates a graph of vertical antenna pair PDOA2 calibration values as a function of a reference elevation angle. FIG. 4 shows the PDOA2 response of the vertical antenna pair versus the elevation angle for different azimuth angles. As mentioned above for FIG. 3, only 5 curves are shown in FIG. 4 for purposes of simplicity and clarity. As can be seen from the curves of FIG. 3, the measured horizontal PDOA1 is not only dependent on the azimuth angle but is also affected by the elevation and antenna characteristics. This effect is even more noticeable in FIG. 4, which shows that the vertical PDOA2 for a given elevation angle can depend on the azimuth angle as well. For instance, for a vertical AOA2 of −36 degrees the azimuth angle can change the measured PDOA from 70 to 125 degrees. The calibration values of FIG. 4 are stored in a memory of, for example, a communications system as a lookup table or array to be used for the AOA estimation method described herein.

Figure 5:
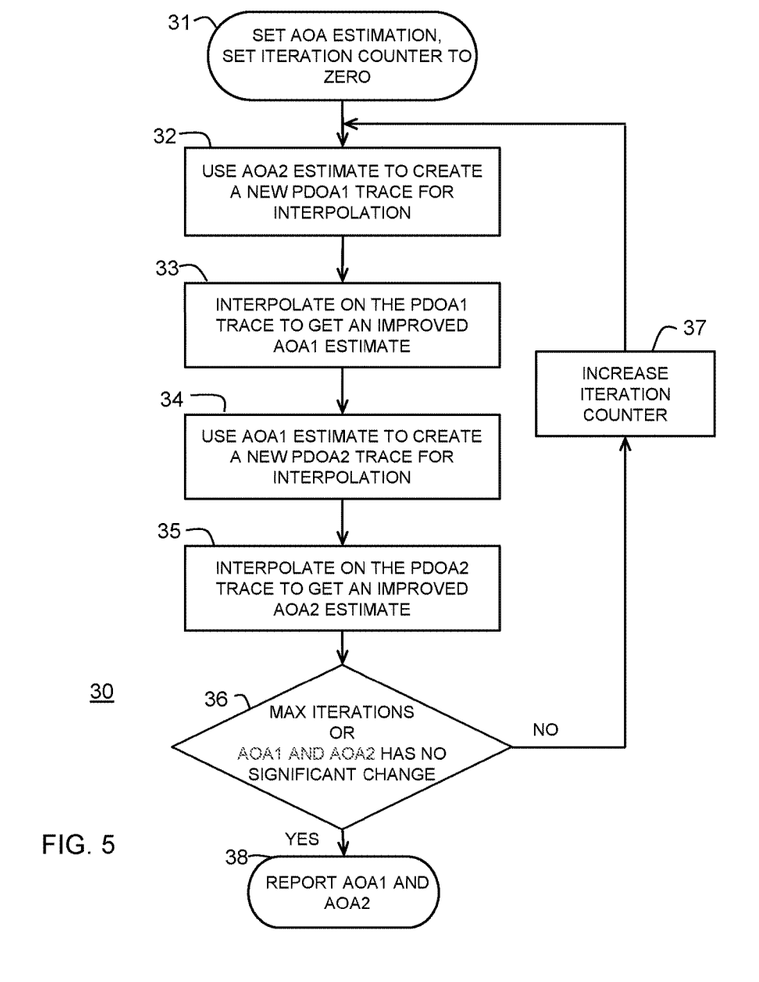
FIG. 5 illustrates a method for estimating an AOA using a PDOA in accordance with an embodiment.

FIG. 5 illustrates method 30 for estimating AOA1 (horizontal AOA) and AOA2 (vertical AOA) using the measured PDOAs. Method 30 begins at step 31. At step 31, a starting point horizontal AOA1 and vertical AOA2 are chosen for beginning the iterations to look for a resulting AOA1 and AOA2 based on measured PDOA1 (horizontal PDOA) and PDOA2 (vertical PDOA). This starting point can be obtained, e.g., by finding the nearest calibration point to the measured PDOA1 and PDOA2 values. Equation (2) below details one way this starting point can be obtained.

$$AOA1, AOA2 = \mathrm{argmin}(|(PDOA1_{cal}(AOA1, AOA2) - PDOA1_{measured})| + \quad (2)$$
$$|(PDOA2_{cal}(AOA1, AOA2) - PDOA2_{measured})|)$$

In equation (2), calibration values $PD0A1_{cal}$ and $PD0A2_{cal}$ are from the lookup tables of FIG. 3 and FIG. 4. The $PD0A1_{measured}$ and $PD0A2_{measured}$ values are measured from the device. The above approach is just one example, and there could be other techniques to estimate starting (AOA1, AOA2) values. For example, the starting value may also be application and antenna pattern (phase response) dependent. For instance, in some use cases, it might help to take the last/most likely incoming angle of the signal instead of the method using equation 2. Also, at step 31, an iteration counter of a device for implementing method 30 is set to zero. At step 32, the AOA2 estimate from the previous iteration is used to select a PDOA1 trace. If no trace is available, a new trace is created based on the known data. At step 33, the selected trace is interpolated to find a best fitting AOA1 estimate for the measured PDOA1. At step 34, the AOA1 estimate from the previous iteration is used to select a PDOA2 trace. At step 35, if no trace is available, a new trace is created based on the known data by interpolating the selected trace to find the best fitting AOA2 estimate for the measured PDOA2. At decision step 36, check if the maximum number of iterations has been reached or if the difference between the newly estimated AOA1 and AOA2 values and the estimates from the previous iteration are below a predetermined value. For example, the predetermined value may be 0.1 degrees. If either of the two conditions of decision step 36 are met, the YES path is taken to step 38 and the best fitting AOA1 and AOA2 values are reported.

If neither of the two conditions are met, return to step 32 via step 37. At step 37, the value of the iteration counter is increased. Steps 32-36 are repeated until one of the two conditions of decision step 36 is met.

The interpolations of steps 33 and 35 can be, e.g., a linear, squared, or cubic spline interpolation to fill the gaps between the calibration points in the lookup tables or arrays. The selected interpolation method may depend on the available computational power. Steps 33 and 35 of the method need a PDOA1/PDOA2 trace as illustrated in FIG. 3 and FIG. 4 to interpolate for finding the AOA. If no PDOA trace is found in the calibration data for a given AOA value, a new trace can be created by combining two already existing traces. If the latest AOA estimate of the method is between two of the existing traces, the trace above and the trace below the AOA estimate of the orthogonal axis can be weighted and averaged afterwards, creating a new PDOA curve that fits the AOA value. Equations (2), (3), and (4) show how the weights of the traces and the new trace can be calculated:

$$\text{weightUpperTrace} = \frac{\text{offsetToLowerTrace}}{(\text{offsetToLowerTrace} + \text{offsetToUpperTrace})} \quad (3)$$

$$\text{weightLowerTrace} = \frac{\text{offsetToUpperTrace}}{(\text{offsetToLowerTrace} + \text{offsetToUpperTrace})} \quad (4)$$

$$\text{newTrace} =$$
$$\text{uppertrace} * \text{weightUpperTrace} + \text{lowerTrace} * \text{weightLowerTrace}$$

The estimated new trace can be used afterwards for getting a new AOA estimate. How the traces are weighted and combined might be application and antenna design dependent.

Figure 6:
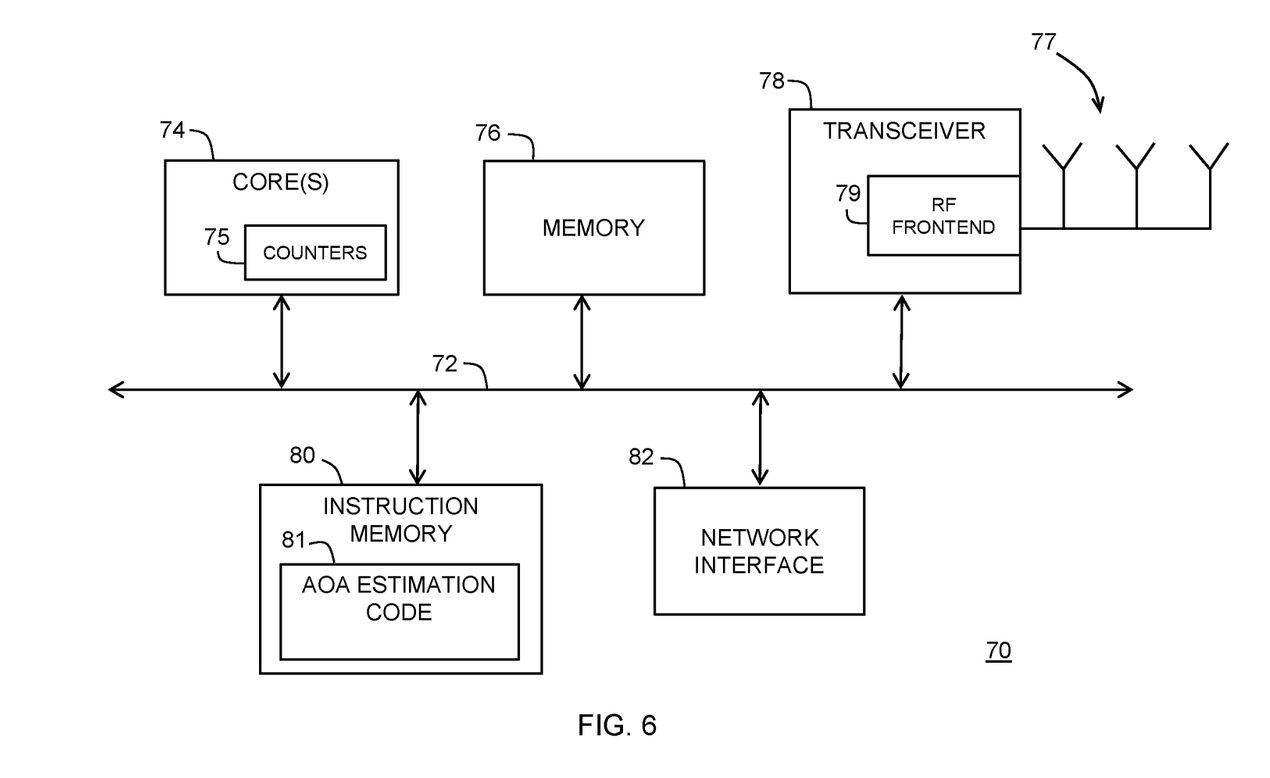
FIG. 6 illustrates a communications system in accordance with an embodiment.

FIG. 6 illustrates a communication system 70 useful for implementing the method of AOA estimation in accordance with an embodiment. Communication system 70 may be implemented on one or more integrated circuits and may be used in an implementation of the described embodiments. Communication system 70 includes bus 72. Connected to bus 72 is one or more processor cores 74, memory 76, transceiver 78, instruction memory 80, and network interface 82. The one or more processor cores 74 may include any hardware device capable of executing instructions stored in instruction memory 80. For example, processor cores 74 may execute the AOA estimation instructions 81. Processor cores 74 may be, for example, a microprocessor, field programmable gate array (FPGA), application-specific integrated circuit (ASIC), or similar device. Processor cores 74 may be implemented in a secure hardware element and may be tamper resistant.

Memory 76 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 76 may be implemented in a secure hardware element. Alternately, memory 76 may be a hard drive implemented externally to data processing system 70. In one embodiment, memory 76 may be used to store instructions. Also, memory 76 may store one or more lookup tables of calibration values used with AOA estimation code 81.

Transceiver 78 includes a transmitter, one or more receivers, and RF frontend 79 coupled to horizontal and vertical pairs of antennas 77 to communicate with other devices on a network and/or to provide localization services. Antennas 77 are illustrated as being representative of the horizontal and vertical antenna pairs described herein. In one embodiment, the three antennas 22, 24, and 26 of FIG. 2 may be used to provide a horizontal antenna pair and a vertical antenna pair. Note that more antenna pairs could be used for 3D AOA estimation. The proposed algorithm disclosed herein could be extended to take the information from these other antenna pairs into account. Transceiver 78 is coupled to bus 72 to allow communication with other circuits on the communication system.

Instruction memory 80 may include one or more non-transient machine-readable storage media for storing instructions for execution by processor cores 74. The instructions may include AOA estimation code 81 to estimate an AOA based on PDOA as disclosed herein. In other embodiments, both memories 76 and 80 may store data upon which processor cores 74 may operate. Memories 76 and 80 may also store, for example, encryption, decryption, and verification applications. Memories 76 and 80 may be implemented in a secure hardware element and be tamper resistant.

Network interface 82 may include one or more devices for enabling communication with other hardware devices. For example, network interface 82 may include, or be coupled to, a network interface card (NIC) configured to communicate according to the Ethernet protocol. Also, network interface 82 may implement a TCP/IP stack for communication according to the TCP/IP protocols. Various other hardware or configurations for communicating are available.

The described method can be implemented efficiently on a standard microcontroller or digital signal processor (DSP) and requires only very limited memory resources. Also, the required memory is scalable depending on the number of calibration points selected for the calibration. In addition, the required calibration data can be easily obtained by simply measuring or simulating one or more PDOAs at the calibration points without the need to have, e.g., a learning phase such as required for training ML-models. This keeps calibration time during manufacturing low which reduces manufacturing cost. Additionally, by applying the described calibration, parasitic side effects like non-ideal antenna design, antenna-crosstalk, and other physical effects of the board design are automatically accounted for, leading to drastically better AOA measurements.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for angle of arrival (AOA) estimation in a communications system, the method comprising:
    estimating starting values for each of a horizontal AOA and a vertical AOA from a received signal;
    setting an iteration counter to an initial value;
    using the vertical AOA starting value to select a horizontal phase difference of arrival (PDOA) trace of horizontal PDOA calibration data;
    interpolating the selected horizontal PDOA trace to determine a best fitting horizontal AOA estimate for a current iteration;
    using a horizontal AOA starting value to select a vertical PDOA trace of vertical PDOA calibration data;
    interpolating the selected vertical PDOA trace to determine a best fitting vertical AOA estimate for the current iteration;
    iterating the steps of using and interpolating one or more times;
    after each iteration, increasing the iteration counter and determining if a maximum number of iterations has been reached or if the best fitting horizontal or vertical AOA estimate has not changed by a predetermined amount;
    when the maximum number of iterations has been reached or when the best fitting horizontal or vertical AOA estimate has not changed by a predetermined value from one iteration to another iteration, reporting the best fitting horizontal and vertical AOA estimates; and
    using the best fitting horizontal and vertical AOA to determine a direction to a transmitting device of the received signal.

2. The method of claim 1, further comprising:
    generating the horizontal antenna pair PDOA calibration data from a pair of horizontal antennas; and
    generating the vertical antenna pair PDOA calibration data from a pair of vertical antennas.

3. The method of claim 1, wherein the horizontal antenna pair PDOA calibration data and the vertical antenna pair PDOA calibration data are stored as tables or arrays in the communication system.

4. The method of claim 1, wherein estimating the starting values further comprises taking an argument of the minimum of a difference of a horizontal antenna pair PDOA calibration point and a measured horizontal antenna pair PDOA plus a difference of a vertical antenna pair PDOA calibration point and a measured vertical antenna pair PDOA.

5. The method of claim 1, wherein both of the steps of interpolating further comprise creating a new trace by combining two existing traces of the vertical and horizontal antenna pair PDOA calibration data.

6. The method of claim 5, wherein the new trace is created by weighting and averaging a trace above the vertical and horizontal AOA estimates and a trace below the vertical and horizontal AOA estimates.

7. The method of claim 1, wherein the communications system is an impulse-radio ultra-wideband (IR-UWB) system.

8. The method of claim 1, wherein the steps of interpolating may be one of either a linear, squared, or cubic spline interpolation.

9. The method of claim 1, wherein the vertical and horizontal PDOA calibration data is stored in memory of the communications system in the form of lookup tables.

10. The method of claim 1, wherein the communications system is implemented in a cellphone.

11. A communications system comprising:
    a transceiver coupled to a pair of horizontal antennas and to a pair of vertical antennas, the pairs of antennas for receiving a signal for determining an angle of arrival (AOA);
    a memory for storing AOA estimation code; and
    a processor for executing the AOA estimation code, wherein the AOA estimation code comprises:
    instructions for estimating starting values for each of a horizontal AOA and a vertical AOA from a received signal;
    instructions for using the vertical AOA starting value to select a horizontal phase difference of arrival (PDOA) trace of horizontal PDOA calibration data;
    instructions for interpolating the selected horizontal PDOA trace to determine a best fitting horizontal AOA estimate for a current iteration;
    instructions for using the horizontal AOA starting value to select a vertical PDOA trace of vertical PDOA calibration data;
    instructions for interpolating the selected vertical PDOA trace to determine a best fitting vertical AOA estimate for the current iteration;

instructions for iterating the steps of using and interpolating one or more times;

instructions for determining, after each iteration, if a maximum number of iterations has been reached or if the best fitting horizontal or vertical AOA estimate has not changed by a predetermined amount; and when the maximum number of iterations has been reached or when the best fitting horizontal or vertical AOA estimate has not changed by a predetermined amount from one iteration to another iteration, instructions for reporting the best fitting horizontal and vertical AOA estimates.

12. The communications system of claim 11, further comprising:

instructions for generating the horizontal antenna pair PDOA calibration data from a pair of horizontal antennas; and instructions for generating the vertical antenna pair PDOA calibration data from a pair of vertical antennas.

13. The communications system of claim 11, wherein the horizontal antenna pair PDOA calibration data and the vertical antenna pair PDOA calibration data are stored as tables or arrays in the memory.

14. The communications system of claim 11, wherein the instructions for estimating the starting values further comprises instructions for taking an argument of the minimum of a difference of a horizontal antenna pair PDOA calibration point and a measured horizontal antenna pair PDOA plus a difference of a vertical antenna pair PDOA calibration point and a measured vertical antenna pair PDOA.

15. The communications system of claim 11, wherein the instructions for interpolating further comprise creating a new trace by combining two existing traces of the vertical and horizontal antenna pair PDOA calibration data.

16. The communications system of claim 15, wherein the new trace is created by weighting and averaging a trace above the vertical and horizontal AOA estimates and a trace below the vertical and horizontal AOA estimates.

17. The communications system of claim 11, wherein the communications system is an impulse-radio ultra-wideband (IR-UWB) localization system.

18. The communications system of claim 11, wherein the maximum number of iterations has been reached when a counter value has reached a predetermined maximum value.

19. The communications system of claim 11, wherein the instructions for interpolating may implement one of either a linear, squared, or cubic spline interpolation.

20. The communications system of claim 11, wherein the communications system is part of a cellphone.

\* \* \* \* \*